Oct. 6, 1925.
M. VAN METER
REBOUND CHECK FOR AUTOMOBILES
Filed Oct. 2, 1924
1,555,894
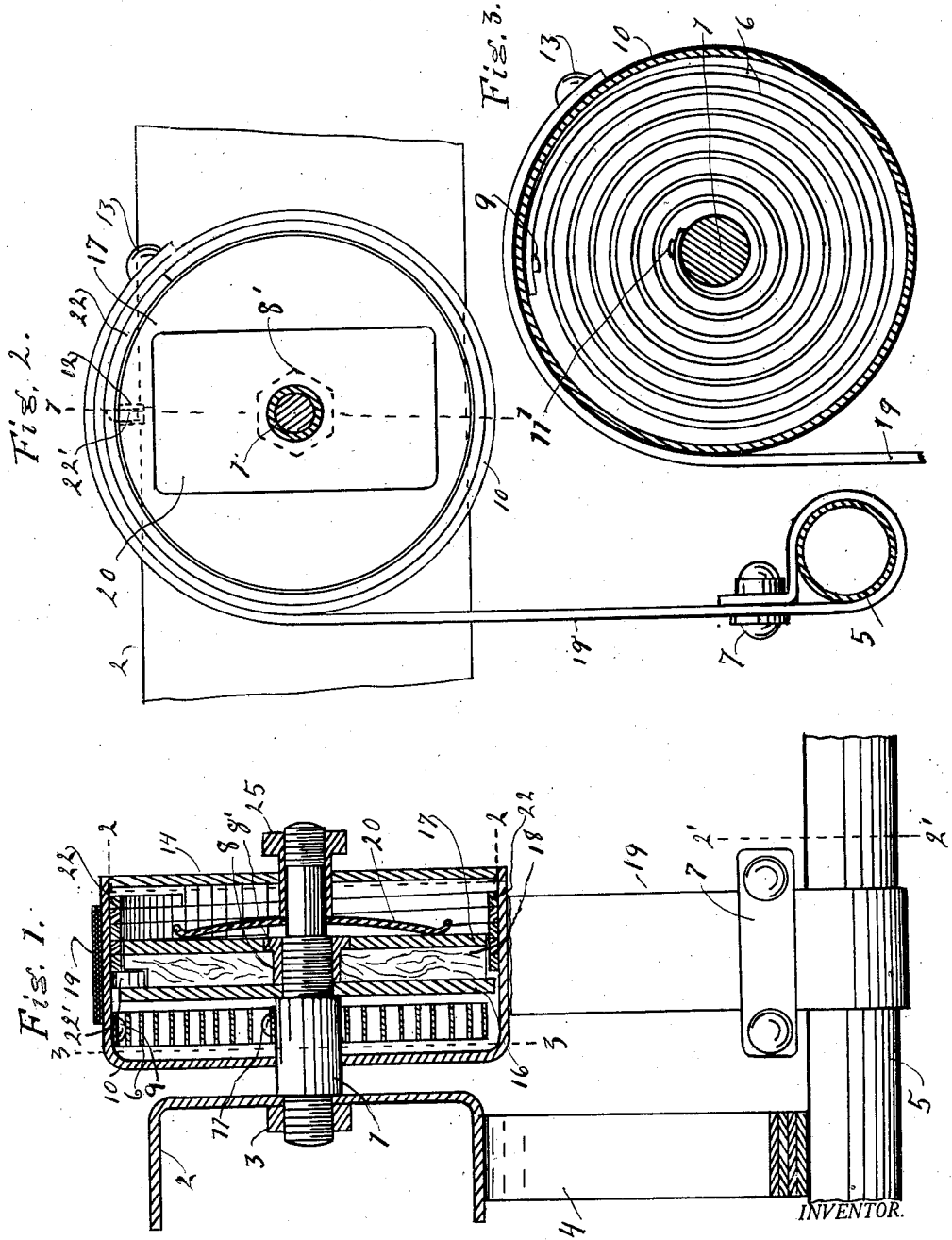
INVENTOR.
Morton VanMeter
BY
ATTORNEY.

Patented Oct. 6, 1925.

1,555,894

UNITED STATES PATENT OFFICE.

MORTON VAN METER, OF CADILLAC, MICHIGAN.

REBOUND CHECK FOR AUTOMOBILES.

Application filed October 2, 1924. Serial No. 741,119.

*To all whom it may concern:*

Be it known that I, MORTON VAN METER, a citizen of the United States, residing at Cadillac, in the county of Wexford and State of Michigan, have invented certain new and useful Improvements in Rebound Checks for Automobiles, of which the following is a specification.

My invention relates to improvements in appliances for controlling the rebound of automobile springs, and its objects are: first, to provide a simple, cheap and reliable means for checking the rebound of such automobile springs after they have been depressed as in driving an automobile over an uneven roadbed; second, to provide a rebound check that may be readily adjusted to the conditions of the roadbed, or to the weight of the automobile, or to the character of the springs; third, to provide a means whereby the recoil preventing device will become operative at the beginning of the spring rebound and will continue to act with practically uniform force during the upward movement of the automobile body, and, fourth, to provide a device of the character named that may be readily attached to, or removed from the automobile.

I attain these objects by the mechanism and construction of parts shown in the accompanying drawing, in which Fig. 1 is a sectional view of the device on the line 1—1 of Fig. 2. Fig. 2 is a sectional elevation of the machine on the line 2—2 of Fig. 1, and Fig. 3 is a sectional elevation of the case looking to the right from the line 3—3 of Fig. 1.

Similar numerals indicate similar parts throughout the several views.

At 5 in Fig. 2, I have shown the axletree of the automobile in section on the line 2'—2' of Fig. 1.

In the construction of the device, I provide a supporting shaft 1 designed to be securely mounted on the automobile frame 2 as by a nut 3, shown in Fig. 1. Revolubly mounted upon the shaft 1, I mount a metallic enclosing case 10 to the outer periphery of which is attached a flexible strap or belt 19 as by rivets 13. The other end of this strap 19, I connect to the axle 5 of the automobile by suitable clamp 7. One end of a spiral spring 6 is connected to the inner periphery of the case 10 at 9 and the other end to shaft 1 at 11. Spring 6 is so installed that throughout the moving range of the case 10, it tends to wind the strap 19 onto the case 10.

I mount a disc 16 securely upon the shaft 1, as by screwing it upon the central bearing of said shaft, so it cannot be made to revolve upon said shaft. I then place a wooden disc 18 upon the shaft and screw the cylindrical body of the nut 8 through an opening in the center of the wooden disc and firmly against the side of the disc 16. The head of the nut 8 is hexagonal, as indicated at 8' in Fig. 2, so I may pass a second metal disc 17 over and upon said head (disc 17 having a central hexagonal aperture) and against the side of the wooden disc so the metal disc 17 may be pressed against the side of the wooden disc but cannot be made to revolve therewith, the wooden disc being made revoluble upon the body of the nut 8. Friction is produced upon the wooden disc by means of a strong spring, as shown at 20, the tension of said spring being governed by the position of the nut 25 upon the shaft 1 as indicated in Fig. 1. To complete the internal construction of the implement I place a helical spring 22 inside of the case, which spring, normally, presses upon the inner periphery of the case 10 and has one end anchored in the wooden disc 18, as indicated by the end 22' extending into the opening 12 in the said wooden disc. The spring 22 must be so placed in the case that when the body of the automobile is moving downwardly the friction of said spring upon the periphery of the case will be so far reduced that the case may be readily made to revolve by the lighter spring 6 to take up the slack of the tension strap 19, and when the body of the automobile starts back upon its upward movement, or rebound, the spring 22 will be expanded or thrown outward by friction upon the surface of the case sufficiently to cause it to bind in the case 10 and revolve with it, driving the wooden disc 18 revolubly between the discs 16 and 17, overcoming the friction tending to hold it stationary and producing a corresponding resistance against the said upward movement of the automobile body, acting through strap 19.

From this description it will be readily understood that the spring 22 acts simply as a one-way friction clutch within the case. With my construction I can use a very light case-winding spring 6 and at the same time exert any desired pressure upon the strap 19, this pressure being practically uniform throughout the upward travel of the automobile body.

I enclose the case 10 by means of a cap, as 14, pressed into the case and securely connected therewith by any of the many available means of securing such parts together.

To connect this device with the automobile, the case, of course, may be secured to the automobile frame 2 by any available means, preferably as shown in Fig. 1. The spring 4 is, of course, properly mounted upon, and secured to the axletree 5 in any of the usual ways of securing springs upon vehicles, and connected to support the body of the automobile by the usual contact with the frame 2.

While I have described and shown a particular means for constructing and connecting this device, I do not wish to restrict myself to said special description as it is evident that the same results may be attained with various other forms of assemblage, as, for instance, the parts 16, 17 and 18 may be differently mounted or shaped without deducting from the efficiency of the rebound check.

Having thus fully described my invention, what I claim as new in the art, is:

1. In a rebound check for automobiles, a revoluble inclosing case, means for securely connecting said case upon the frame of the automobile, a flexible tension strap connected at one end with the revoluble case of the rebound check and at the other end with the axletree of the automobile, a spring mounted in said case in a manner to form a frictional clutch in connection with the inner periphery of the case, and means for revolving the case to take up the slack of the tension strap upon the downward movements of the frame of the automobile.

2. In a rebound check for automobiles, a revoluble enclosing case, means for securing said case to the frame of an automobile, a tension strap connected at one end with the periphery of the case and at the other end with the axletree of the automobile, a spring within the case for revolving the case upon its downward movements to hold continuous tension upon the tension strap, stationary discs mounted within the case, a revoluble disc clamped between said stationary discs, a helical spring anchored at one end to said revoluble disc and the body of the said spring coiled and positioned to form a frictional clutch in connection with the inner periphery of the case.

3. In a rebound check for automobiles, a shaft securely mounted upon the frame of an automobile, an enclosing case revolubly mounted upon said shaft, a tension strap connected at one end with the periphery of the case and at the other end with the axletree of the automobile, a metal disc securely mounted upon said shaft within the case, a nut for holding said disc firmly in place, said nut having an annular body and a polygon formed head, a friction disc mounted upon the said annular body of the nut and revoluble thereon, a second metal disc mounted upon the head of said nut, an arched spring mounted upon the shaft within the case in position to bear upon the second metal disc, a nut screwed upon the end of the shaft and having an annular body thereon for contacting the arched spring and regulating the pressure of said spring upon the frictional disc, a helical spring connected at one end with the periphery of the friction disc and the body of this spring adapted to form a friction clutch in connection with the inner periphery of the case, and a spring connected at one end with the inner periphery of the case and at the other end with the shaft for actuating the case to hold the tension strap taut upon the downward movements of the automobile frame.

4. In a rebound check for automobiles, a shaft rigidly attached to an automobile, a case having a cylindrical portion axially revoluble about the shaft, a helical spring in frictional contact with the cylindrical portion of the case, means for rotating the case, in one direction when the axle and frame of the car approach each other, and in the opposite direction when they recede from each other.

Signed at Grand Rapids, Michigan, September 30, 1924.

MORTON VAN METER.